United States Patent [19]

Gladney et al.

[11] Patent Number: 4,714,992

[45] Date of Patent: Dec. 22, 1987

[54] COMMUNICATION FOR VERSION MANAGEMENT IN A DISTRIBUTED INFORMATION SERVICE

[75] Inventors: Henry M. Gladney, Saratoga; Douglas J. Lorch; Richard L. Mattson, both of San Jose, all of Calif.

[73] Assignee: International Business Machines Corporation, Armonk, N.Y.

[21] Appl. No.: 801,897

[22] Filed: Nov. 26, 1985

[51] Int. Cl.4 .............................................. G06F 1/00
[52] U.S. Cl. .................................... 364/200; 364/300
[58] Field of Search ................. 364/200 MS File, 300

[56] References Cited

U.S. PATENT DOCUMENTS 4,558,413 12/1985 Schmidt et al. ..................... 364/300
4,621,321 11/1986 Boebert et al. ..................... 364/200

OTHER PUBLICATIONS

IEEE Transactions on Computers, vol. C-34, No. 6, Jun. 1985, "The Exclusive-Writer Approach to Updating Replicated Files in Distributed Processing Systems", by Chu et al.
ACM Transactions on Database Systems, 5(1)U, 1-17, 1980, "Introduction to a System for Distributed Databases (SDD-1)", by Rothnie et al.
ACM Proceedings SIGMOD, 30-39, 1983, "On the Design of a Query Strategy in a Distributed Database Environment", by Yu et al.
ACM Proceedings SIGMOD, 228-237, 1983, "Overview of an ADA Compatible Distributed Database Manager", by Chan et al.
ACM Transactions on Database Systems, 7(2), 209-234, 1982, "Read-Only Transactions in a Distributed Database", by Garcia-Molina et al.

Primary Examiner—Raulfe B. Zache
Attorney, Agent, or Firm—Mark A. Haynes; Simon K. Lee

[57] ABSTRACT

In a distributed processing system network in which at least one node operates as a source location having access to data objects of a database, and at least one other node operates as a replica location storing replicas of data objects from the source location, managing obsolescence of the replicas is performed by having the replica locations submitting requests to the source location for ascertaining obsolescence of data objects. The source location, responsive to a request from a requesting replica location, extracts identifiers of a set of obsolete objects and communicates them to the requesting replica location. Upon receiving the identifiers, the requesting location renders inaccessible those data objects corresponding to the identifiers received. The source location then removes those identifiers that have been communicated to the requesting replica location.

10 Claims, 20 Drawing Figures

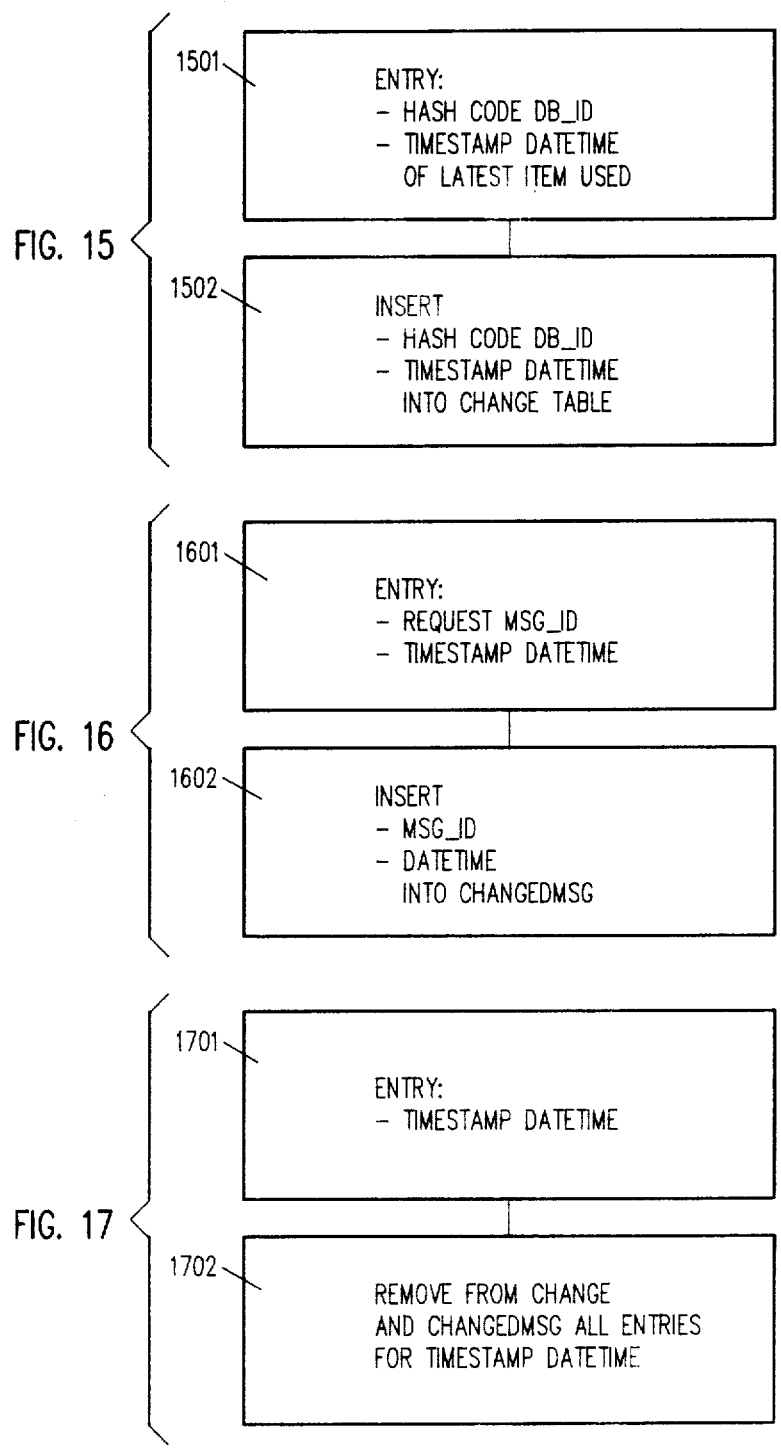

COMMUNICATION FOR VERSION MANAGEMENT IN A DISTRIBUTED INFORMATION SERVICE

CROSS-REFERENCE TO RELATED APPLICATION

U.S. patent application Ser. No. 801,896, entitled IMPACT CALCULATION FOR VERSION MANAGEMENT IN A DISTRIBUTED INFORMATION SERVICE, filed on the same day, owned by a common assignee and having the same inventors as the present case.

FIELD OF THE INVENTION

The present invention relates to managing versions of data objects stored in a plurality of nodes of a distributed processing system. More particularly, the present invention relates an apparatus and method for managing obsolete versions of data objects at nodes of a distributed system.

BACKGROUND OF THE INVENTION

Distributed processing systems that are made up of intelligent workstations adapted to access central databases at source locations are being adapted to a growing number of applications. In many of these applications, a given workstation may require access to a single data object from some source database more than once. This requires much duplication of effort by the systems managing the database and the network.

To reduce this duplication of effort, it is desirable to maintain replicas of frequently accessed data objects at the workstation using such data objects to enhance responsiveness at the workstation, to improve availability of the communication channels by preventing repeated requests for the same object and to reduce costs. However the use of storage systems at the workstation locations which maintain replicas of frequently accessed data aggravates the problem of data obsolescence. If data in the central database is changed, then replicas of that data stored at workstation locations become obsolete. Therefore a system to manage obsolete data at workstations is necessary.

Well known systems, called consistency control protocols (CCP), for maintaining replicas of data objects viewed at workstations up to date respond to a change in a source data object by preventing access by any workstation to replicas of the changed data object until replacement of existing replicas made obsolete by the change is complete. This approach has proven burdensome in systems that communicate across relatively slow or faulty channels, such as telephone lines, because it takes a relatively long time to accomplish replacement of all obsolete replicas of the data in the distributed system. Also, it imposes certain availability requirements on channels or requires denial of access to data when sufficient channels are not operable. See, Wesley W. Chen and Joseph Hellerstein, "The Exclusive-Writer Approach to Updating Replicated Files in Distributed Processing Systems," *IEEE Transactions on Computers,* Vol. C-34, No. 6, June 1985, pages 489–500.

Also, because data objects at source locations change and replicas of those data objects are stored at locations remote from the source, a number of different derivations of the same data object may be created. For instance, a data object may consist of a frame of text to be displayed on a video terminal. A second data object consisting of a second frame of text may include information that matches with information in the first frame. Thus, if the source location updates one frame rendering all replicas of that one frame obsolete at replica locations throughout the system, and if prior to updating the second frame to assure view consistency, a replica location requests a replica of both frames, then the replica location will receive inconsistent versions of the two data objects. Prior art systems for maintaining replicas of data objects viewed at workstations up to data have been unable to assure consistency of views of data objects in this environment without preventing access by all workstations to updated data objects until all obsolete replicas of data objects stored at workstations and sets of related data objects have been rendered invalid. Again, this approach is very burdensome in systems which communicate slowly and/or in which there are large numbers of replicas of some individual data items.

U.S. Pat. No. 4,432,057, invented by Daniell et al, issued Feb. 14, 1984 entitled "Method for the Dynamic Replication of Data under Distributed System Control to Control Utilization of Resources in a Multiprocessing, Distributed Database System" teaches a method by which requests for access to specific versions of data are permitted and confirmation of updated data is selectively deferred by use of a control procedure implemented at each node and utilizing a status and control file at each node which describes that node's view of the status for shared data items at other nodes. By distributing the responsibility for controlling access to updated data to each node in the system, the Daniell et al patent suffers from much duplication of work by all the nodes in the system. The Daniell et al patent provides a good discussion of the prior art and is incorporated by reference for the purposes of that discussion.

SUMMARY OF THE INVENTION

The present invention provides an apparatus and a method for managing obsolescence of replicas of data objects in a distributed processing system that is robust even in systems using relatively slow or faulty communication links, which provides workstation autonomy, consistency of views and economy of mechanism and which continues to have good performance at each workstation even when there are large numbers of workstations.

In one aspect, the present invention is an apparatus for managing obsolescence of replicas of data objects in a distributed processing system, having a network of nodes interconnected by links. At least one node in the system operates as a source location having access to source data objects and at least one other node operates as a replica location having a means for storing replicas of source data objects received from the source location. The apparatus comprises a manager means, in communication with the source location, for maintaining obsolescence data that identifies obsolete replicas. Further, a means at requesting replica locations is provided for generating an invalidation request for at least a portion of the obsolescence data. Also, a server means is provided, in communication with the manager means and the requesting replica location and responsive to the invalidation request, for supplying the portion of obsolescence data to the requesting replica location.

In another aspect, the present invention is a method for managing obsolescence of replicas of data objects, the objects being utilized in multiple processing nodes of a distributed system. At least one node in the system operates as an object source location having means for storing a source database containing data objects. At least one other node operates as an object replica location having means for storing replicas of requested objects received from a source location. Objects stored at source locations are alterable, whereby replicas corresponding to altered objects stored at replica locations may become obsolete. The source location further maintains a list of identifiers of obsolete replicas. The method comprises the step of:

(a) responsive to a request from a first replica location to ascertain obsolescence of replicas of data objects, extracting identifiers of a set of obsolete replicas from the source location list of identifiers;
(b) communicating said identifiers, if any, as an atomic demand/response transaction to said first replica location, and removing said identifiers communicated from the source list of obsolete replicas;
(c) rendering inaccessible at said first replica location any replicas corresponding to those identifiers received from the source locations; and
(d) removing from the source location those identifiers communicated to said first replica location.

According to the present invention, storage management for replicas in the replica location is accomplished by demand replacement and the preparation of data identifying obsolete data replicas is separated from the use of the data identifying such replicas. Also, the source and replica locations are independent, such that replica locations independently choose when to fetch replicas of data objects and when to determine obsolescence of replicas.

BRIEF DESCRIPTION OF THE DRAWINGS

FIGS. 11, 12, 13, 14, 15, 16, 17, 18A, 18B and 18C are flowcharts illustrating the operation of the invalidation manager in the delivery subsystem according to the present invention.

DETAILED DESCRIPTION

Figure 1:
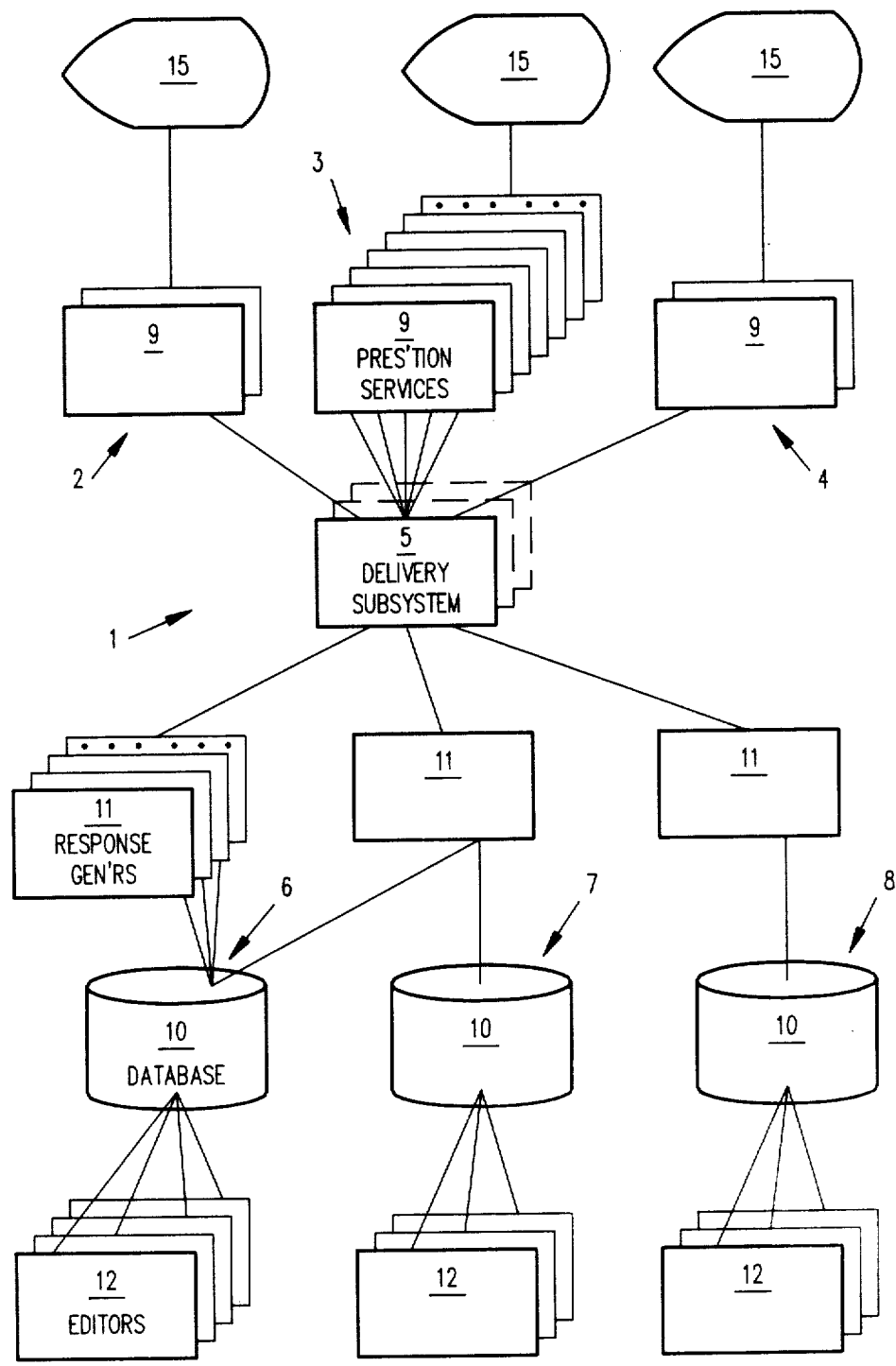
FIG. 1 is an overview block diagram of a system employing the present invention.
Figure 2:
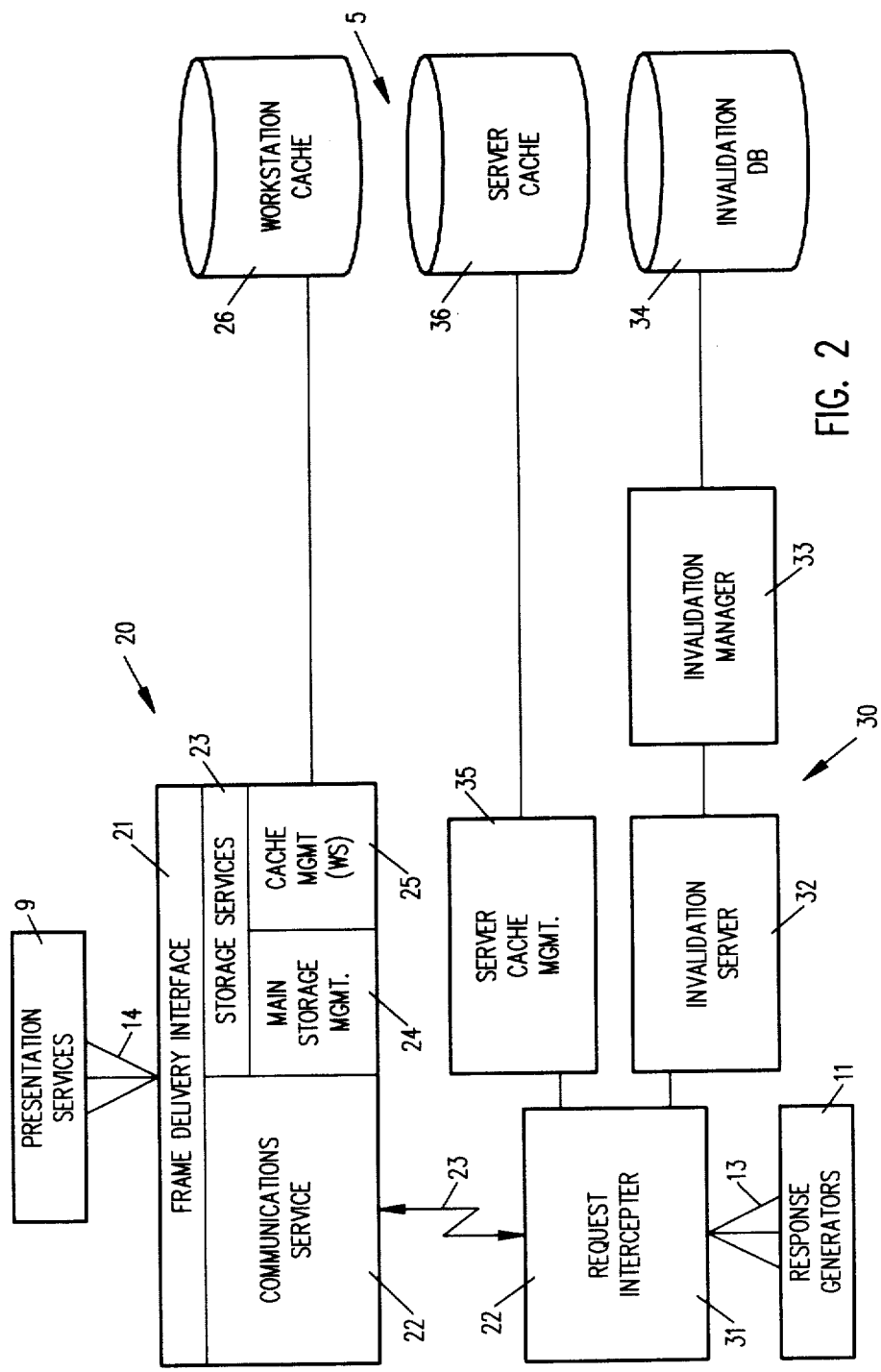
FIG. 2 is a block diagram of a delivery subsystem taught by the present invention.

With reference to FIG. 1, a distributed processing system within which the present invention can be used is described to provide a system overview. With reference to FIG. 2, the apparatus according to the present invention is described. The balance of the figures set out the operation of a preferred embodiment of the present invention.

I. System Overview

FIG. 1 shows a generalized distributed processing system 1 made up of a network of nodes connected by communication links implementing the present invention. The nodes of the distributed processing system 1 shown in FIG. 1 include a plurality of workstations 2, 3, 4 in communication with a delivery subsystem 5 which may include multiple communication subsystems. The delivery subsystem 5 further communicates with one, or more, nodes operating as source locations 6, 7, 8. Of course, a given distributed system 1 could include any number of nodes, including workstations, delivery subsystems and source locations.

The workstations 2, 3, 4 are typically computers which each include one or more presentation services 9 and display systems such as a video monitor 15 for presenting data to a user.

The source locations 6, 7, 8 typically include databases 10, such as relational databases, frame libraries, collections of data files, or other data storing systems that store source data objects. The databases 10 communicate with the delivery subsystem 5 through response generators 11 which access respective databases 10 to supply response messages to the delivery subsystem 5 in response to requests. A response message may include data objects or parts of data objects from one or more source locations 6, 7, 8 and/or one or more databases 10 within the source locations 6, 7, 8. Typically, the requests are generated at the workstations 2, 3, 4 or the replica location in response to user input or node control programming.

The source locations 6, 7, 8 also include editors 12 which maintain their respective databases 10. The editors update, delete, reorganize or perform other editing services on data objects stored in their respective databases 10. Thus, the data objects stored in the databases 10 are subject to being changed from time to time whereby more than one version of a data object may be created. Therefore, the replicas of data objects being viewed by a workstation 2, 3, 4 may be replicas at any given time of obsolete versions of source data objects.

The present invention provides an apparatus, within the delivery subsystem 5 in a preferred embodiment, for managing the versions of data objects that exist in the system 1 and preserving consistent views of replicas of data objects at workstations 2, 3, 4.

II. Delivery Subsystem

FIG. 2 is a block diagram of a delivery subsystem 5 according to the preferred embodiment of the present invention. The delivery subsystem 5 shown in FIG. 2 includes at least one source location 30 communicating with the response generators 11 of one or more databases (see FIG. 1) and at least one replica location 20 communicating with the presentation services 9 at one or more workstations. Although not shown in FIG. 2, the invention supports large numbers of replica locations, such as replica location 20. Replica location 20 includes a frame delivery interface 21, a communications service 22 for the replica location, storage services 23, storage management 25, and a work-station cache 26.

Workstations may, for example, utilize frames of data for display on a video monitor. Thus the presentation services 9 of such a workstation include a means for generating a request for source data objects to fulfill the needs of a given frame for display on the video monitor. A frame delivery interface 21 provides data objects in the form required by the presentation services 9 at a given workstation. Also, the frame delivery interface 21 provides request signals from the presentation services 9 to the communication service 22 for transmission to a source location 30 across at least one communication link 23. The communication service 22 likewise receives responses including replicas of data objects from the source locations 30 for supply through the frame delivery interface 21 to the presentation services 9. Replicas of data objects received by the communications service 22 at the replica location are stored through storage management 25 in a workstation cache 26 using the request signal as a search key.

The workstation cache 26 in the preferred embodiment is organized as a table having a request column, "MSG-ID", and a response column, "MSG", where the request key "MSG-ID" is generated by the presentation services 9 requesting data, and the response "MSG" is supplied by the response generator 11. In this manner the workstation cache 26 stores commonly used responses "MSG" for quick access by the presentation services 9 of the workstations in communication with the replica location 20. The workstation cache 26 can be managed using well known cache management schemes such as least-recently-used replacement algorithms and the like. Of course the management of the workstation cache 26 can be optimized to meet the needs of a particular user.

As indicated in FIG. 2, a communication service 22 provides a means for communicating across communication link 23 requests, responses and other information between at least one replica location 20 portion and at least one source location 30 portion of the delivery subsystem 5. Associated with the source location 30, there is provided a request interceptor 31, an invalidation server 32, an invalidation manager 33, an invalidation database 34, server cache management 35 and a server cache 36.

The request interceptor 31 intercepts requests supplied by replica locations 20 and supplies the requests to the appropriate means for the generation of a response. When the request from the replica location 20 is one in which involves the managing of obsolete replicas of data objects that may be stored in workstation caches 26 in the system, then the request interceptor 31 supplies that request to the invalidation server 32. The invalidation server 32 is a means in communication with the invalidation manager for processing the requests from replica locations 20 to determine obsolescence of replicas of data objects stored in the workstation caches 26. The invalidation server 32 retrieves messages from the invalidation manager 33 that identify obsolete replicas of data objects that may be stored in workstation caches 26 and communicates those messages to the replica locations 20 in the form of an atomic demand/response transaction.

The invalidation manager 33 maintains the invalidation database 34 storing obsolescence data including a list of identifiers of replicas that include obsolete data objects. The invalidation manager 33 hides and uses the invalidation database 34 to manage obsolescence for a set of workstation caches 26 in replica locations 20.

The invalidation database 34 stores data tables which are set out in Table 1 entitled "Database Description". The database description provided in Table 1 is organized by listing the title of the table on the left margin followed by a list of the column headings of the table and a description of the data contained in those columns.

TABLE 1

| INVALIDATION DATABASE | |
|---|---|
| Table USERIDS | |
| USER_ID | Identifier of a replica location (RL) using invalidation services. |

TABLE 1-continued

| INVALIDATION DATABASE | |
|---|---|
| Table BADMESSAGES | |
| MSG_ID | Identifies a message sent to some RL |
| USER_ID | ID of a RL yet to be informed that the identified message is no longer valid. |
| DATETIME | Version number for grouping invalidation orders into sets which must be applied as units if the RL is to have consistent contents. Timestamps are used, but other formats are possible. |
| Table CHANGE — work table only | |
| DB_ID | Identifies a table and a record set which is changed in the source DB. |
| DATETIME | Version number |
| Table CHANGEDMSG — work table only | |
| ID | Identifies a message MSG (response) which is known to be changed. |
| DATETIME | Version number |
| Table DEPENDMSG | |
| MSG_ID | Identifies a MSG sent to some RL. |
| DB_ID | Identifies a Table and record set from the source DB that have been used to construct the message MSG. |

In a preferred embodiment, the source location 30 in the delivery subsystem 5 includes a server cache 36 which is serviced by the server cache management 35 in communication with the request interceptor 31. The server cache 36 is used to store replicas of data objects which have been sent via the communications service 22 to the replica location 20 in the system. The cache management 35 for the server cache 36 can be implemented using a variety of cache management schemes such as a least-recently-used algorithm. The server cache 36 is organized as shown in Table 2.

TABLE 2

| SERVER CACHE DATA | |
|---|---|
| Table MSGCACHE | |
| MSG | A replica of a message MSG (response) sent to a RL |
| MSG_ID | Message identifier or key |
| DATETIME | Version number of MSG |
| MSG_LENGTH | Identifies the length of the response message MSG stored. |

In operation, a replica location 20 supplies a request to the communications service 22 to ascertain obsolescence of replicas of data objects that may be stored in the workstation cache 26 of the requesting replica location. The request to determine obsolescence may be generated either by the replica location 20 or by individual workstations associated with the replica location 20 depending on the particular implementation. The request interceptor 31 communicates the request to ascertain obsolescence of data objects to the invalidation server 32. The invalidation server 32 extracts through the invalidation manager 33 identifiers of a set of obsolete versions of data objects related to the requesting replica location. Then, the invalidation server 32 communicates the extracted identifiers, if any, across the communication link 23 in the form of an atomic demand/response transaction to the requesting replica location 20. Upon completion of the atomic demand/response transaction, the invalidation manager 33 updates the obsolescence data tables (BADMESSAGES, DEPENDMSG) to remove the communicated identifiers from set of identifiers related to the requesting replica location in the invalidation database 34. At the replica location 20, the replicas corresponding to the communicated identifiers are rendered inaccessible by the cache management 25 and cache space in the workstation cache 26 in which the inaccessible replicas were stored becomes available for subsequent storage use.

By providing obsolescence data only in response to requests from replica locations 20, the invention allows separate replica locations 20 to view inconsistent versions of data. However, each replica location 20 views only data consistent with the versions accessible at that replica location 20 stored in its local cache 26. This consistency requirement unique to the present invention imposes the need to prevent the source location 30 from sending versions of data objects to a requesting replica location 20 that are inconsistent with the versions accessible at the requesting replica location 20.

When a replica location 20 supplies a request MSG ID for a source data object MSG to the communication service 22, the request interceptor 31 communicates the request to a response generator 11 or server cache 36. The source database and server cache may contain data objects that are inconsistent with versions of data objects accessible at the requesting replica location 20. In response to a request for a data object, the request interceptor 31 supplies the server cache 36 or response generator 11 version number information or timestamps obtained from the invalidation server 32 that identifies the versions accessible at the replica location so that a response is supplied that is consistent with the version number associated with the requesting replica location. In this manner, the replica location 20 is prevented from presenting inconsistent views of data objects to the users at the workstations.

III. Functional Components of a Delivery Subsystem

A detailed discussion of the operation of components of the delivery subsystem 5 follows, including a description of a preferred method for maintaining a list of identifiers of obsolete versions of data objects in the invalidation manager 33. The maintenance of the list of identifiers is described in detail in a companion case filed on the same day as the present case, owned by the same assignee, and having the same inventors, entitled "IMPACT CALCULATION FOR VERSION MANAGEMENT IN A DISTRIBUTED INFORMATION SERVICE."

III. A. Request Interceptor

Figure 3:
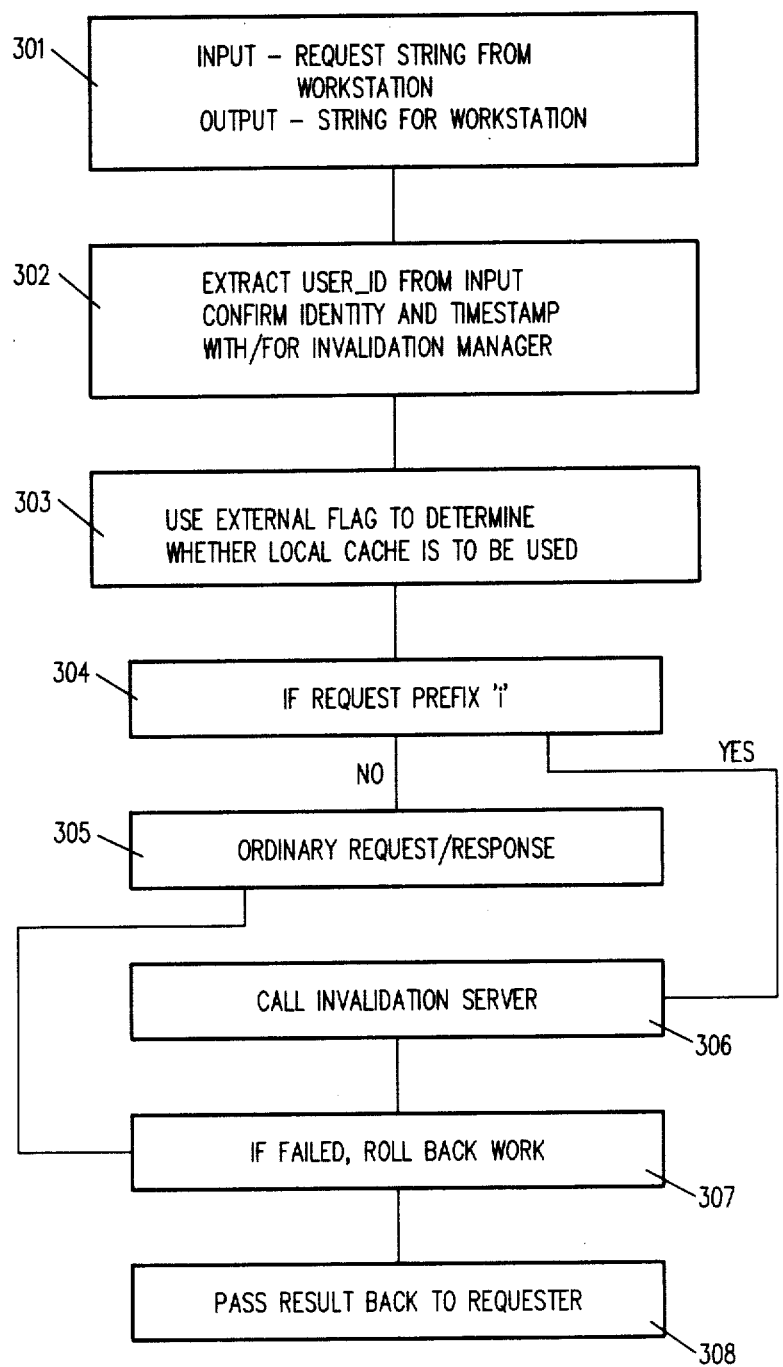
FIGS. 3 and 4 are flowcharts illustrating the operation of the request interceptor in the delivery subsystem.

A flow chart of the operation of the request interceptor 31 is shown in FIG. 3. The request interceptor 31 receives as input from the communications service 22 a request or string of requests from the replica location 20 including a replica location identifier USER_ID for the requesting station and provides as output to the communication service a response consisting of a string of data objects MSG or other messages for the replica location 20 (Block 301).

In operation, the request interceptor extracts the replica location identifier USER_ID from the input string and confirms the identity and timestamp indicating currency for the replica location from the PL/1 global variable MSGSTMP (Block 302). Next, if the server cache 36 is to be used, an external flag will be set, so the request interceptor 31 checks for the flag (Block 303). In the preferred implementation the server cache 36 is always used. Next, the prefix of the request from the workstation is reviewed to determine whether it is in fact a request for invalidation server (Block 304). If it is not a request for the invalidation server, then the request is processed as a request-for-data subroutine which is described with reference to FIG. 4 (Block 305). If the request is determined in Block 304 to be a call for the invalidation server, then the invalidation server subroutine (See FIGS. 7 through 10) is called (Block 306). If the invalidation server subroutine called in Block 306 fails, then the work is rolled back so that the request can be called again by the replica location 20 (Block 307). If the call to the invalidation server subroutine in Block 306 succeeds, then the request interceptor 31 passes the response back to the requesting replica location (Block 308).

The request-for-data subroutine in the request interceptor which is called in Block 305, is described with reference to FIG. 4. The request-for-data subroutine retrieves replicas of data objects from the source databases and returns them to a replica location 20. First, the invalidation manager is queried to determine a currency timestamp indicating the view of data being processed at the requesting replica location (Block 401). Next, an attempt is made to retrieve the requested data objects from the server cache 36 (Block 402). If the access to the server cache fails or suffers an error, then the message is rolled back to allow the request to be reprocessed (Block 403). To indicate that a request for a data object is being processed, a status counter is set to zero (Block 404). The status counter is used as described below by the invalidation server 32. The subroutine then determines whether the access to the server cache has been successful (Block 405). If the access to the server cache was successful, then the response is passed back to the request interceptor (Block 409) which in turn returns the response to the requesting replica location (see Block 308 of FIG. 3).

If the access to the server cache was not successful in retrieving the requested response, then the subroutine generates a call to the response generators associated with the given delivery subsystem (Block 406) and the response generators return the response fulfilling the request along with a set of hash codes DB_ID identifying particular portions of the source databases which were used to fill the request. The hash codes DB_ID received from the response generators are returned to the DEPENDMSG table in the invalidation manager, with each hash code DB_ID paired with the request MSG_ID to which it is responsive, unless the particular pair is already in the table (Block 407). Next, a replica of the response is stored into the server cache, if desired, along with a timestamp indicating the currency of the response (Block 408).

III. B. Server Cache Manager

Figure 5:
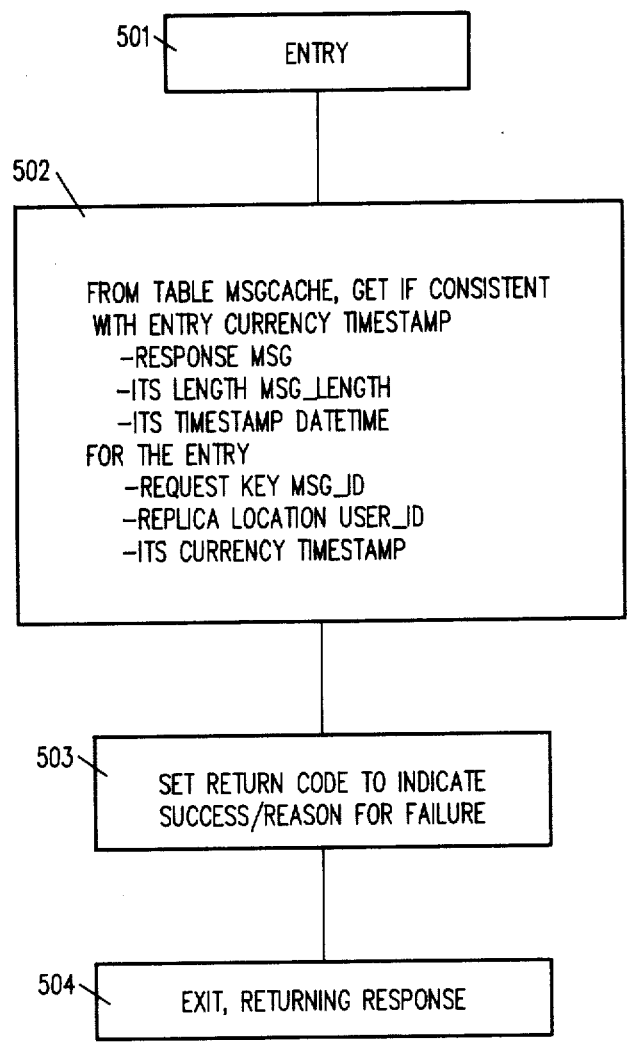
FIGS. 5 and 6 are flowcharts illustrating the operation of the server cache manager in the delivery subsystem.
Figure 6:
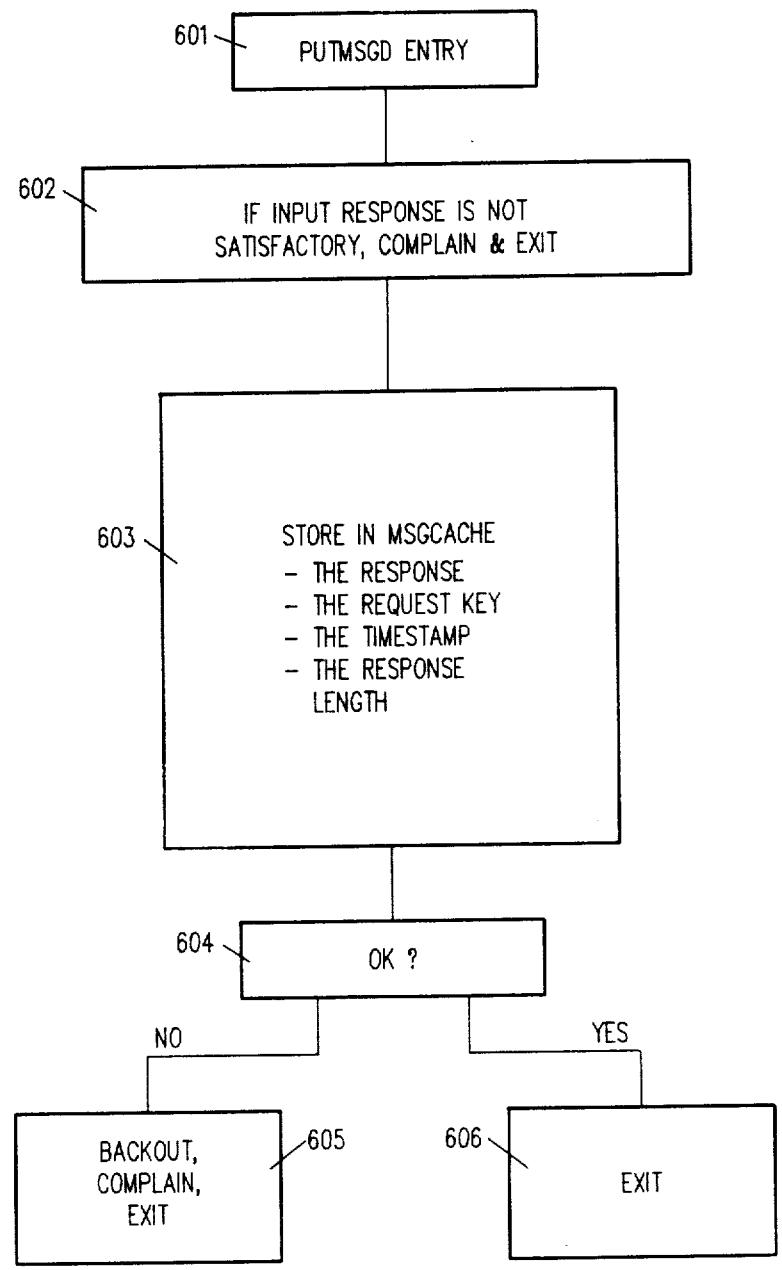

The server cache manager 35 operates according to subroutines shown in FIGS. 5 and 6. The subroutine shown in FIG. 5 operates in response to a call (Block 501) to retrieve a response MSG from the MSGCACHE table in the server cache as described in Block 502. In Block 502, the subroutine retrieves the requested response MSG and data indicating the length of the response MSG_LENGTH and the timestamp DATETIME for the response. The entry to the subroutine includes the request MSG_ID, the replica location identifier USER_ID for the location generating the request, and the latest timestamp DATETIME allowable for the requesting replica location to prevent inconsistencies in data viewed at that replica location. The latest timestamp DATETIME is indicated by the timestamp of the next set of incomplete invalidations for the requesting replica location as determined below with reference to FIG. 13. In Block 503, a return code is set to indicate success in obtaining a response or failure and the reason for the failure (Block 503). Last, the routine is exited and the response is returned to the request interceptor (Block 504).

Figure 4:
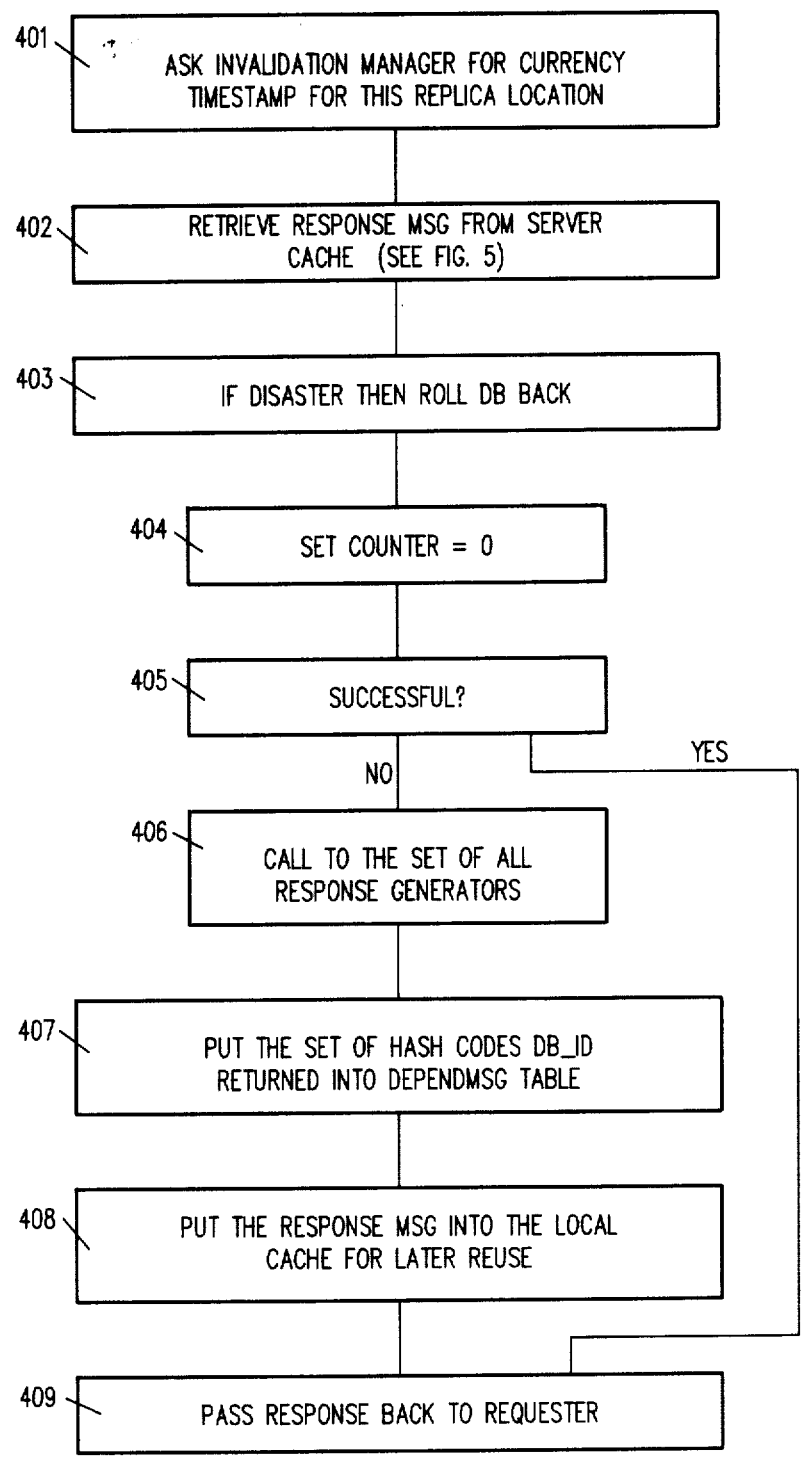

In response to a call to store into the server cache, such as Block 408 of FIG. 4, (Block 601), the subroutine of FIG. 6 reviews the response MSG to be stored to the MSGCACHE table in the server cache to determine whether it is satisfactory (Block 602). If the response MSG is not satisfactory, then the subroutine is exited. Otherwise, an entry is made to the MSGCACHE table including response MSG, the request key MSG_ID the timestamp DATETIME and the response length MSG LENGTH (Block 603). Last, the subroutine determines whether the subroutine has been successful and no errors have occured (Block 604). If there were errors or the subroutine was otherwise unsuccessful, then the changes are all backed out and a complaint message is issued (Block 605). Otherwise the system exits (Block 606).

III. C. Invalidation Server

FIGS. 7 through 10 illustrate the method of operation of the invalidation server and invalidation manager according to the present invention. The method operates in four modes. The modes are determined by a message flag that is set to "done" or "not done" and a counter that is set to "1" or "0" (See FIG. 4, Block 403).

Figure 7:
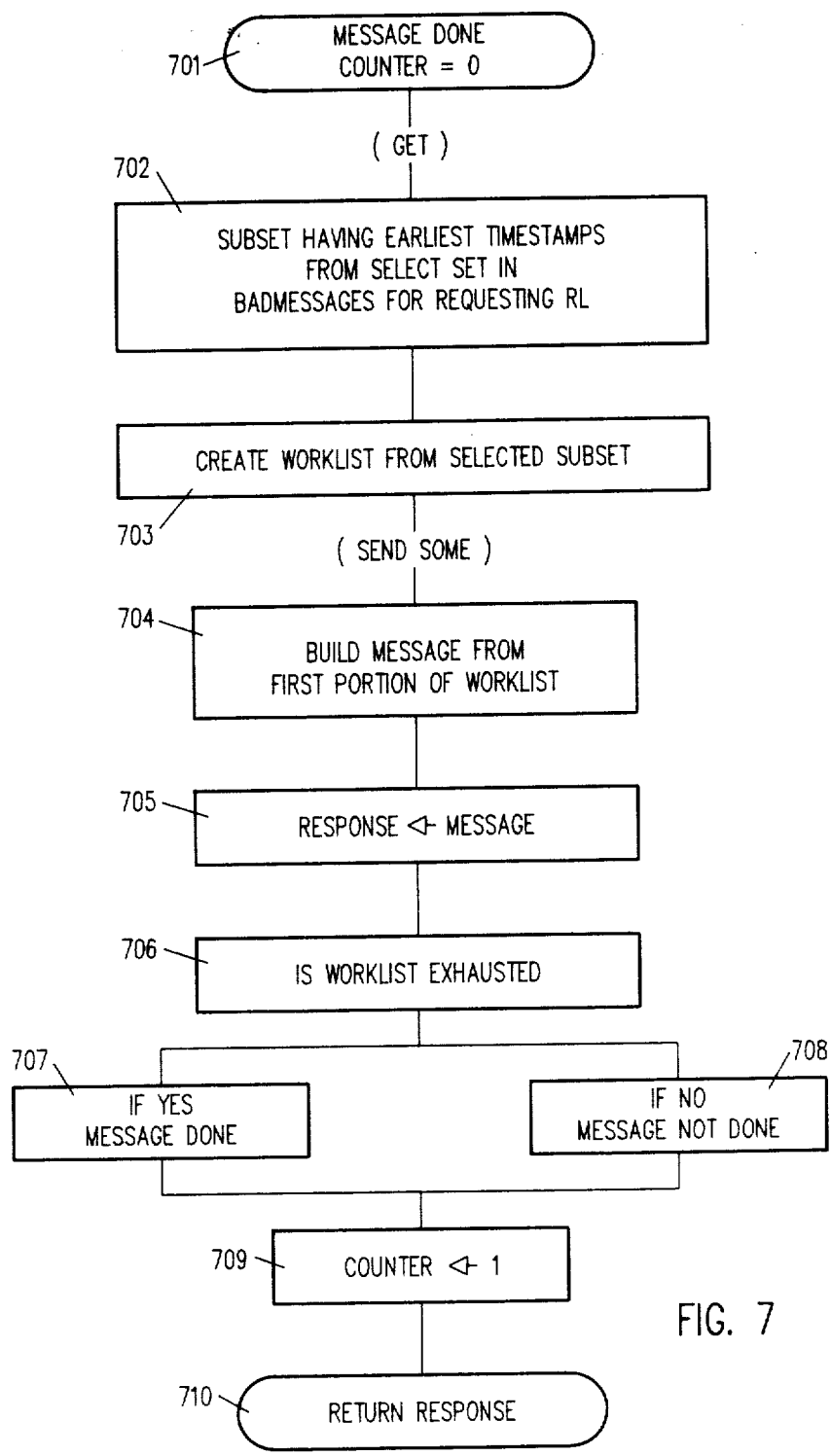
FIGS. 7 through 10 are flowcharts illustrating the operation of the invalidation server in the delivery subsystem according to the present invention.

In the first mode, as illustrated in FIG. 7, the message flag indicates "done" and the counter is equal to zero (Block 701). In this mode responsive to a request to determine obsolescence of replicas, the invalidation server executes a GET subroutine. The GET subroutine first selects a subset having the earliest timestamp DATETIME from the set in the BADMESSAGES table for the requesting replica location USER_ID provided that such a timestamp indicates a time prior to the present instant (Block 702). From the selected subset, the invalidation server creates a work list (Block 703) having a start location and a pointer to the next portion of the worklist to be processed.

Upon creation of the work list (Block 703), the server executes the subroutine SEND SOME. Subroutine SEND SOME builds a message from a first portion of the worklist (Block 704). Next, the response to be sent is set equal to the message built from that first portion (Block 705). The server then determines whether the work list is exhausted by use of the first portion (Block 706). If the work list is exhausted, then the message flag is set to "done" (Block 707). If the worklist is not exhausted then the message flag is set to "not done" (block 708). Next, the counter is set equal to 1 (block 709), indicating that a worklist is in the process of being sent to the requesting replica location so that in a subsequent step, the invalidation server can check that the next portion of the worklist may be transmitted. Finally, the response containing the invalidation message is returned (block 710).

Figure 8:
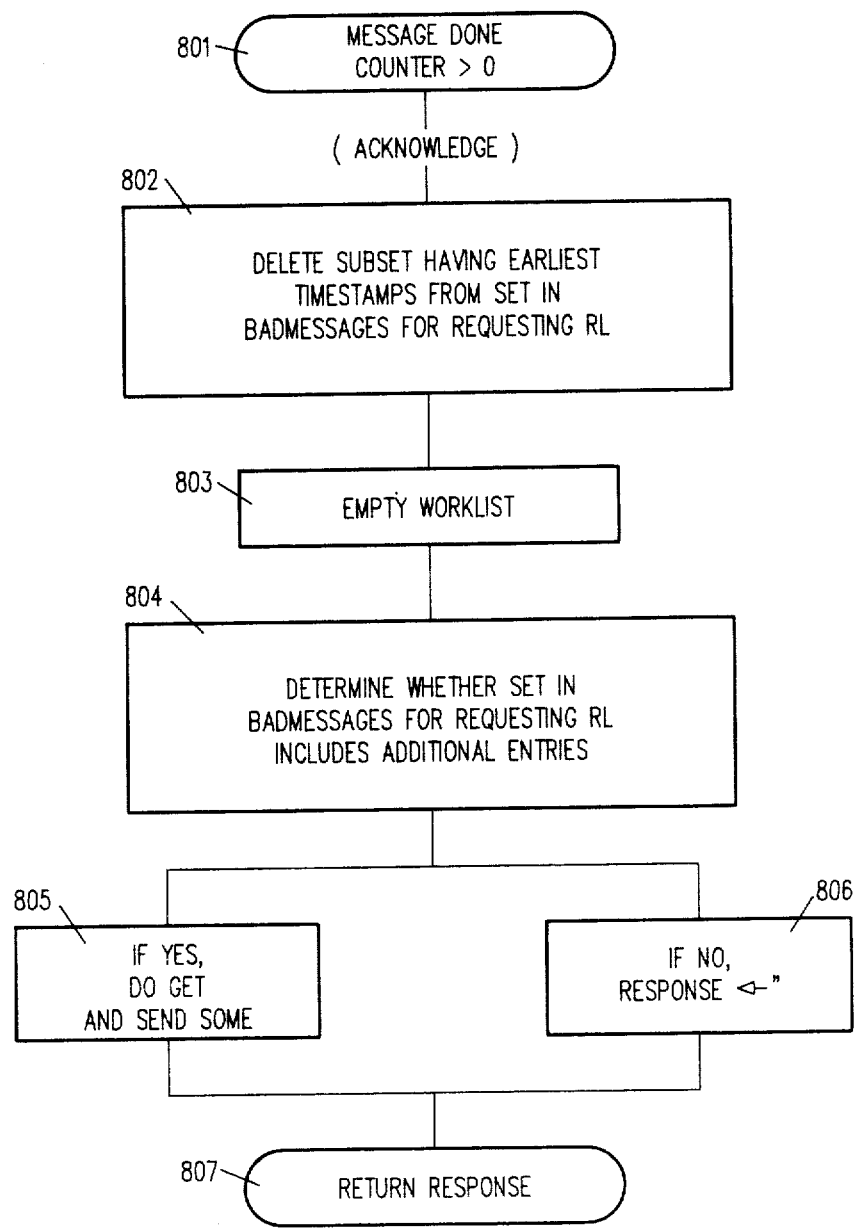
Figure 9:
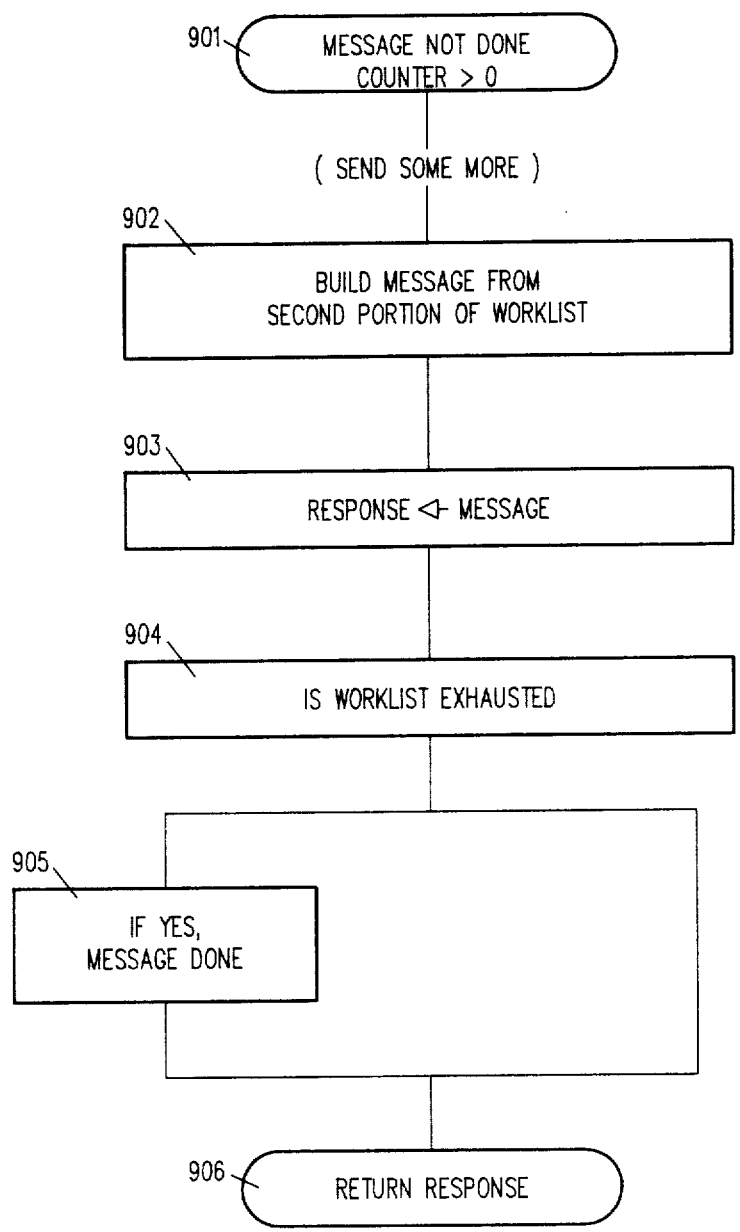

In the normal sequence of events as indicated by the process described with reference to FIG. 7, the next request from the requesting replica location would be a repeated request to determine obsolescence of replicas of data objects in its workstation cache. In this case, the counter had been set equal to 1 and the message flag will either be set "done" or "not done", as indicated by blocks 701, 707 and 708, respectively, of the flow chart in FIG. 7. FIG. 8 illustrates the mode in which the message flag is set to "done".

FIG. 8 operates in the mode when the message flag indicates that the previous message is done and the counter is greater than zero block 801). In this mode, an ACKNOWLEDGE subroutine is executed.

The first step in this subroutine is to delete the subset having the earliest timestamps from the set in BADMESSAGES for the requesting replica location (block 802). At this point the atomic demand/response transaction is complete, because the requesting replica location acknowledges receipt of the earlier response generated by the process discussed with respect to FIG. 7 by requesting additional information concerning obsolescence of data in its cache and the message flag indicates that there is no more information in the worklist to be sent to that replica location to maintain consistency of versions in its cache. Therefore, the requesting workstation by requesting additional information concerning obsolescence acknowledges deletion of the obsolete versions of data objects stored in its cache and the invalidation manager is free to delete that information from the BADMESSAGES table.

In the next step in the process shown in FIG. 8, the invalidation server empties the worklist (block 803). Then, the server determines whether the set in BADMESSAGES for the requesting replica location includes additional entries (block 804). If there are such additional entries in the set for the requesting replica location whose timestamp is prior to the present instant, the additional entries will have timestamps more recent than the timestamps of the subset just deleted in block 802. If there are additional entries in the set for the requesting replica location, then the server does the GET and SEND SOME subroutines in a manner identical to that described with reference to FIG. 7 (block 805). If there are no additional entries in the BADMESSAGES table for the requesting replica locations, then the server sets the response equal to the empty set indicated by "" (block 806). In either case, the generated response is then returned to the requesting replica location (block 807). The second state flowing from the process described in FIG. 7 is set out in FIG. 9. This state corresponds to the message flag being set to "not done", and the counter being greater than zero (block 901). In this third mode, the invalidation server executes the SEND SOME MORE subroutine. The first step SEND SOME MORE subroutine is to build a message from a next portion of the worklist (block 902). The worklist from which this message is generated was created at block 703 of FIG. 7. Then the response is set equal to the message built in block 902 (block 903). Next, the invalidation server determines whether the worklist is exhausted (block 904). If the worklist is exhausted, then the message flag is set to "done" (block 905). The counter is not changed in this sequence. Next, the response is returned to the requesting location (block 906).

Figure 10:
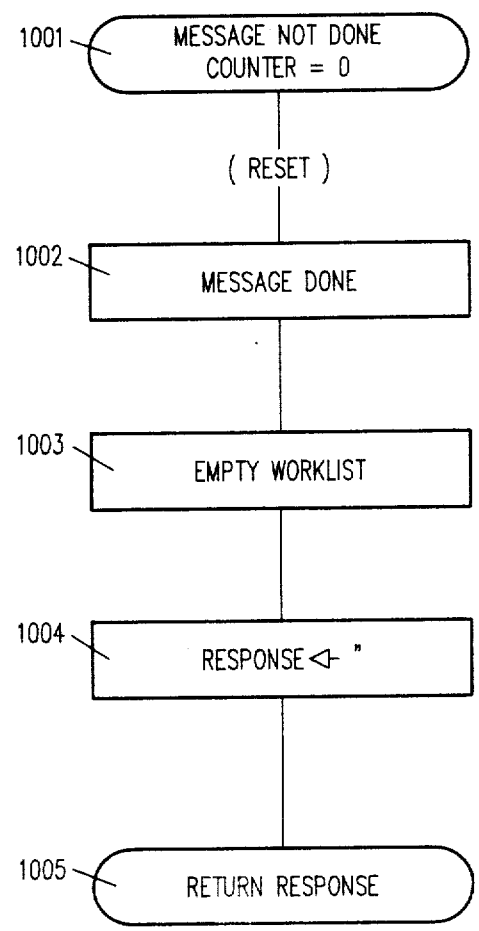

FIG. 10 illustrates the case in which the message flag is set to "not done" and the counter is equal to zero when a request to determine obsolescence of data stored in the cache of a given replica location is received by the invalidation server. This state can occur between the execution of the process described with reference to FIG. 7 and those described with reference to FIGS. 8 and 9 in the event that the request interceptor receives a request other than one to determine obsolescence of data in the cache of a replica location. In this event the request interceptor has set the counter equal to zero (See FIG. 4, Block 403) to prevent the execution of the processes described in FIGS. 8 and 9.

Accordingly, the process shown in FIG. 10 is indicated when the message is not done and the counter is equal to zero (block 1001). In this state, the invalidation server executes a RESET subroutine.

The reset subroutine described in FIG. 10 begins by setting the message flag to "done" (block 1002). Then the worklist generated by block 303 of the process in FIG. 7 is reset (block 1003) by setting an address pointer for the memory location assigned to the worklist function back to the start position. The response is set to the empty set indicated by "" (block 1004). Then the empty set response 4 is returned to the requesting replica location (block 1005).

Thus in the case illustrated in FIG. 10, when the transaction for sending a message for the deletion of obsolete replicas of data objects stored in workstation caches is interrupted, then the BADMESSAGES table is not affected by the interruption and any existing worklist is reset. The status flags including the message flag and the counter are set to "done" and zero respectively so that the next call to the invalidation server to determine obsolescence of data objects at the requesting replica location will be processed according to the steps shown in FIG. 7. This assures that the entire worklist for the earliest timestamps of data objects that may be obsolete at a requesting replica location are processed in an atomic demand/response transaction.

III.D. Invalidation Manager

The invalidation manager 33 can be implemented as a virtual machine for managing the invalidation database 34 and the interfaces to the invalidation database through the invalidation server 32 and the source location database editors. The subroutines illustrating the operation of the invalidation manager as it communicates with the invalidation server and the source locations are described below in FIGS. 11 through 18.

Figure 11:
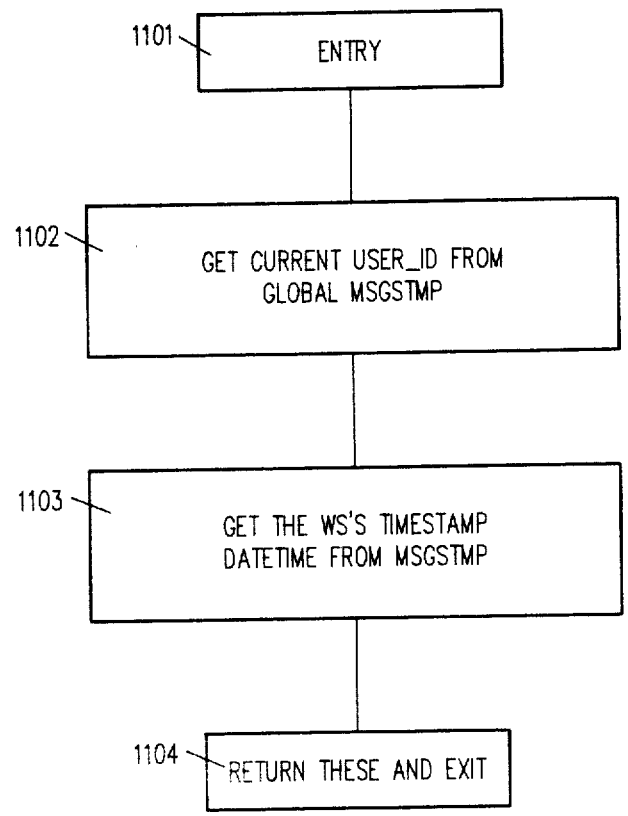

FIG. 11 illustrates the flow chart of a subroutine that when called retrieves from the PL/1 global variable MSGSTMP the replica location identifier USER_ID for the requesting replica location and the timestamp DATETIME indicating the currency of that replica location (Blocks 1102 and 1103). Then both the replica location USER_ID and the timestamp DATETIME are returned to the requestor (Block 1104).

Figure 12:
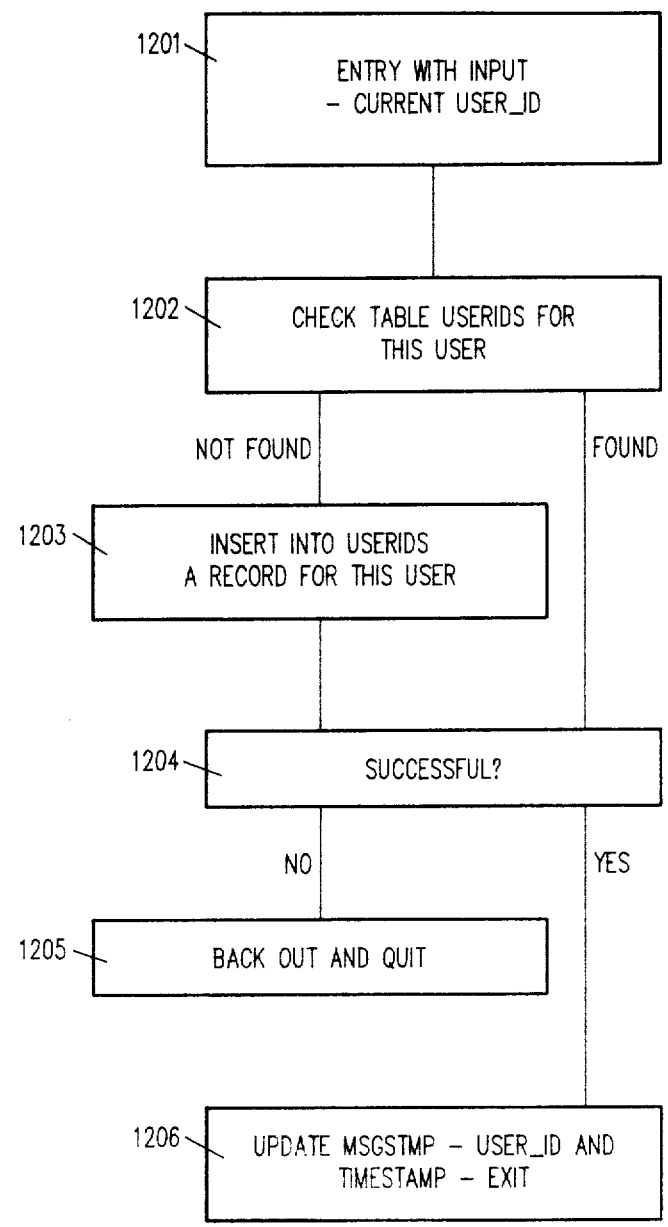

An entry to subroutine shown in FIG. 12 includes the current replica location identifier USER_ID (Block 1201). The subroutine checks the table USERIDS for the entered replica location identifier USER_ID (Block 1202). If the table does not include an entry for the entered replica location then a record is inserted (Block 1203). If an entry was found in the step described in block 1202, then no change is made to the table. Next the subroutine determines whether or not the check of the USERID table was successful (Block 1204). If it was not successful, then the subroutine is backed out of so that the access can be requested again (Block 1205). If the check of the table was successful, then the global variable MSGSTMP storing the replica location identifier USER_ID and the timestamp DATETIME is updated (Block 1206) using the subroutine described in FIG. 13.

Figure 13:
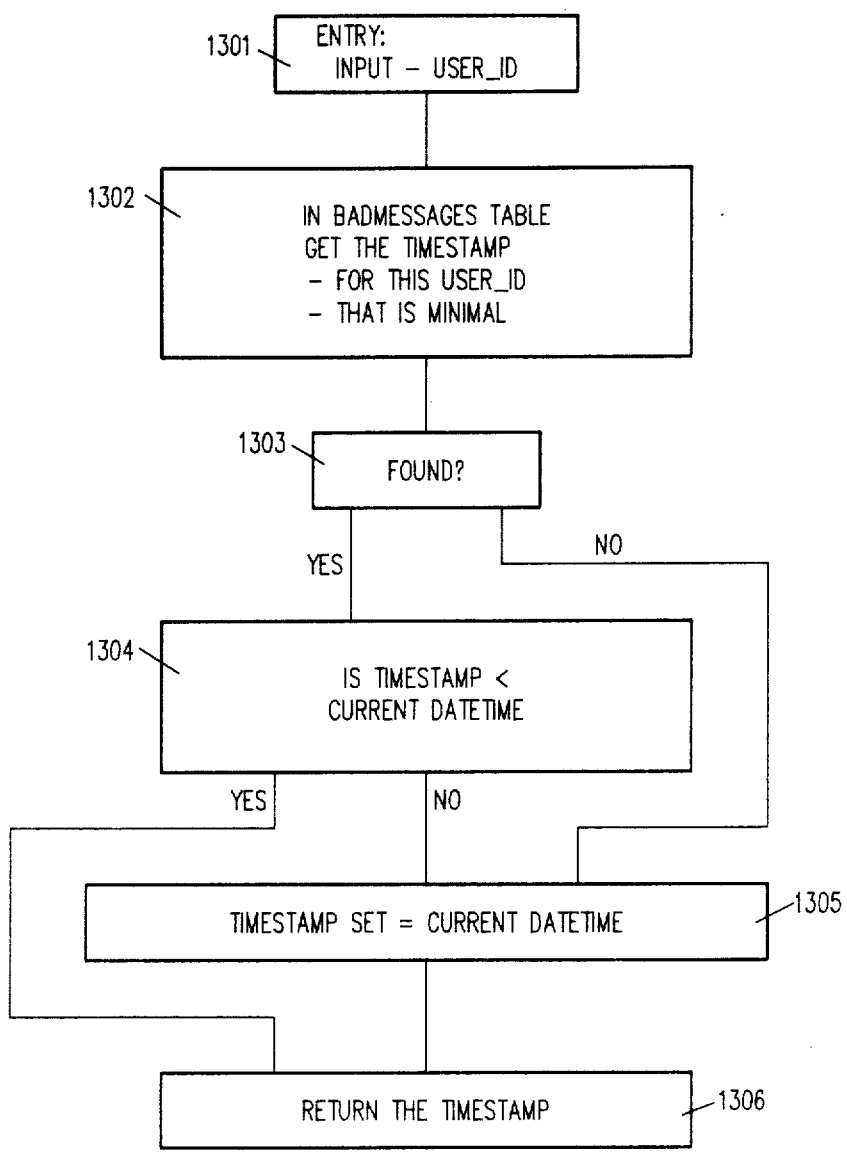

FIG. 13 shows the flowchart for a subroutine for updating a global variable MSGSTMP for an identified replica location. The oldest timestamp, or currency version number, for an identified replica location for use in preventing the request interceptor from passing inconsistent views of data to the replica location is returned. An entry to the subroutine includes the replica location identifier USER_ID (Block 1301). Next, the BADMESSAGES table is searched to return the timestamp DATETIME of the oldest entry for this replica location (Block 1302). If an entry for the requesting replica location is found (Block 1303) then the routine determines whether the oldest timestamp DATETIME in the BADMESSAGES table for this replica location is older than the current timestamp indicating the present time (Block 1304). If an entry is not found in the step described in Block 1303, then the timestamp to be returned for the replica location is set to the current timestamp (Block 1305). Likewise, if the timestamp for the oldest entry in the BADMESSAGES table for the requesting replica location is newer than the current timestamp (indicating a change to take effect in the future) for the replica location, then the timestamp for the replica location to be returned is set to the current timestamp. Otherwise, the timestamp retrieved from the BADMESSAGES table is returned (Block 1306).

Figure 14:
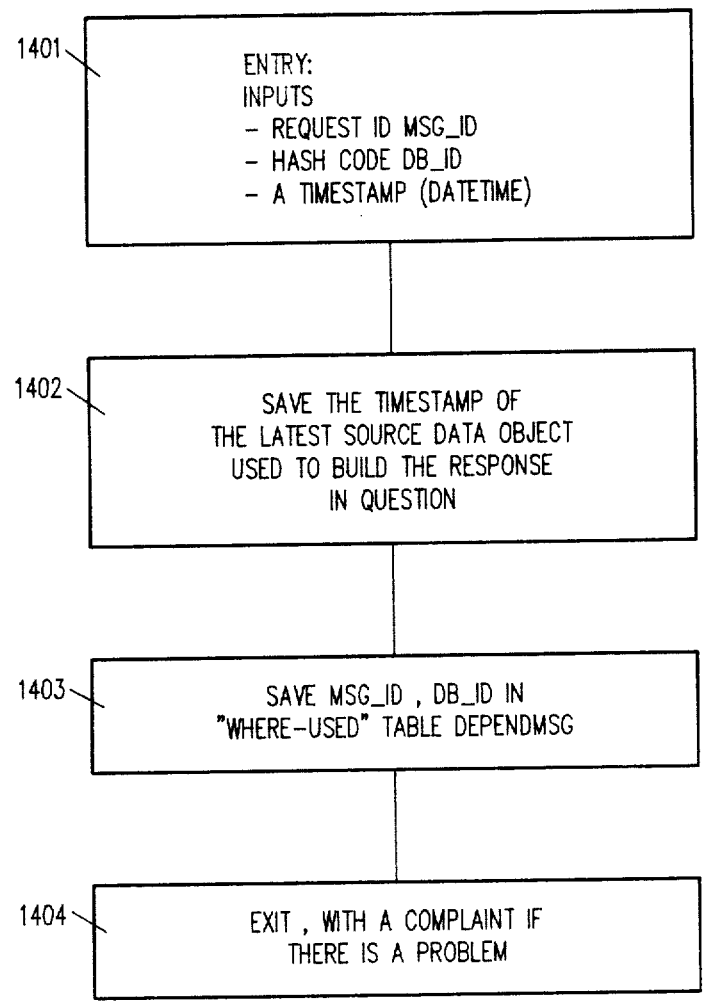

FIG. 14 illustrates a subroutine which records data concerning a subject response MSG in the DEPENDMSG table in the invalidation database and determines the timestamp of the most recent data element used to form the response MSG. The inputs to the subroutine are the request MSG_ID and a set of hash codes DB_ID indicating the source data elements used to create the response MSG to the request MSG_ID (Block 1401). The subroutine saves the timestamp from the latest database element used to build the response identified by the request MSG_ID as the records are scanned to fill the DEPENDMSG table (Block 1402). Next, the subroutine records in the DEPENDMSG table in the invalidation manager the request MSG_ID paired with each hash code DB_ID in the set of hash codes to record information indicating where a given source database element is used within the system (Block 1403). Last, the system exits after recording dependencies while detecting any problems that could have occurred during the attempt to record the dependencies and issuing a complaint if such problems were detected (Block 1404).

The manager also includes a subroutine, not shown in the figures, that returns the timestamp of the latest database element used to build a given response as saved in Block 1402 of FIG. 14 to be used in Block 408.

The subroutine shown in FIG. 15 operates to insert data into the CHANGE work table in the invalidation manager. The entry into this subroutine is the set of hash codes DB_ID supplied by a source editor identifying the portions of the source database including the source data elements changed in response to a source editor operation and the timestamp of the latest source data item affected by the subject operation (Block 1501). Next, each of the items listed in Block 1501 is inserted into the CHANGE table (Block 1502).

The subroutine shown in FIG. 16 is used in place of the subroutine shown in FIG. 15 when the source database accessed is organized such that a request MSG_ID identifies the elements in the source database and can be used as a hash code. In this case, the entry to the subroutine includes the request MSG_ID identifying affected source data objects and a timestamp associated with the request (Block 1601). The subroutine inserts each of the items listed in Block 1601 into the CHANGEDMSG table (Block 1602).

The subroutine shown in FIG. 17 serves to communicate that a set of changes have been processed by storage in the BADMESSAGES table. An entry into this subroutine is a timestamp (Block 1701). All entries for the entered timestamp are removed from the CHANGE and CHANGEDMSG tables (Block 1702).

Figure 18A:
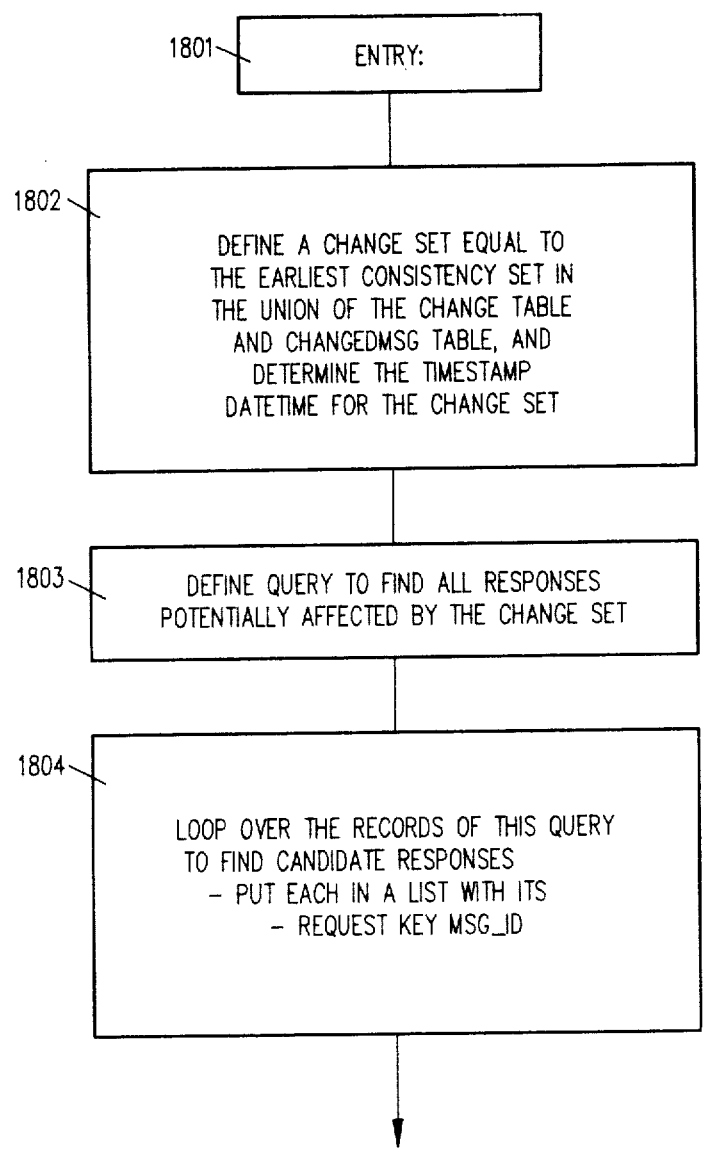
Figure 18B:
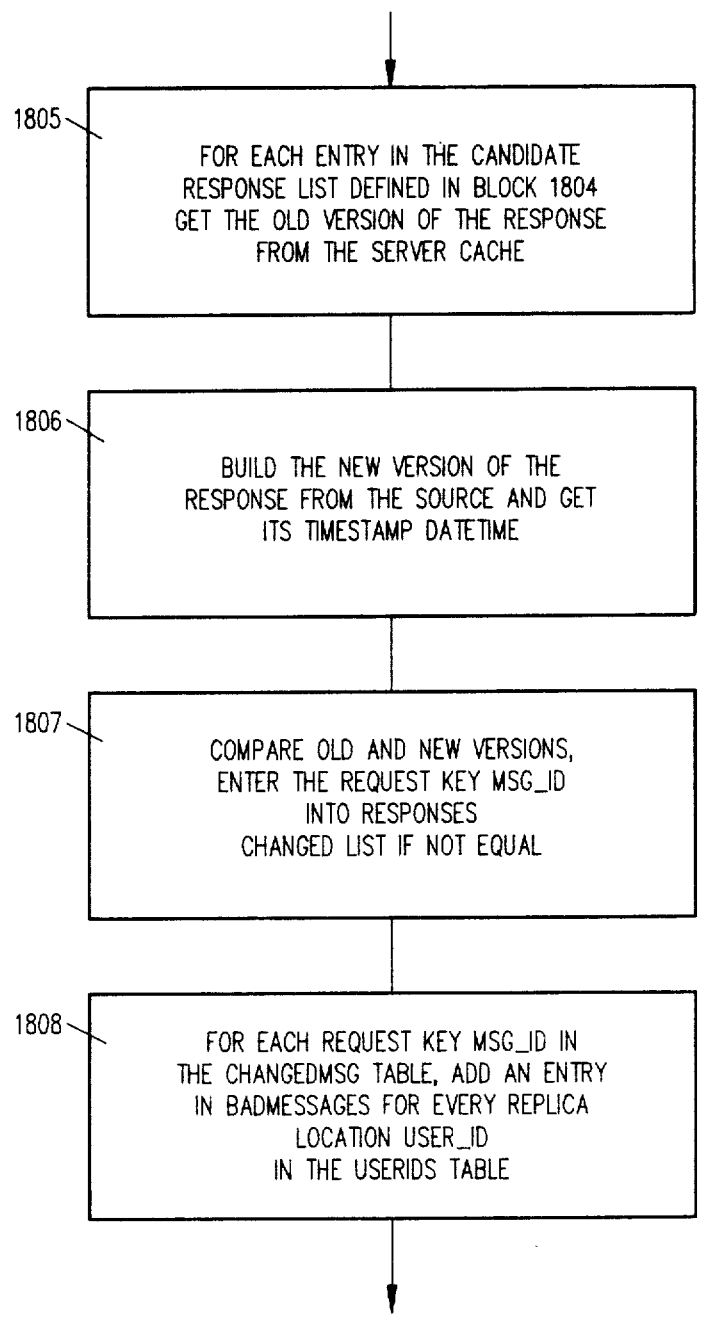
Figure 18C:
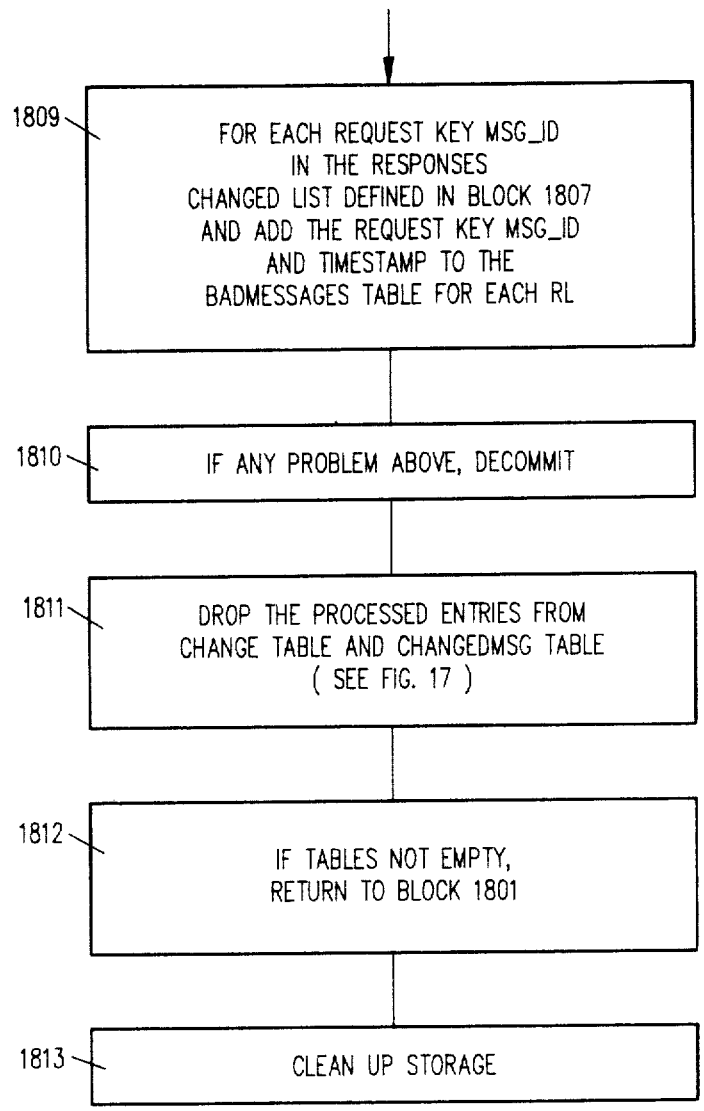

The subroutine described in FIG. 18 uses the CHANGE and CHANGEDMSG tables created by subroutines described in FIGS. 15 and 16 to build for each effective replica location a list of the identifiers of obsolete messages for which replicas may be held at the replica locations. All changes recorded in these work tables since the most recent prior call to the subroutine described in FIG. 18 are collected into "consistency sets" identified by the timestamp associated with the changes in each set. In response to an entry (Block 1801), the subroutine defines a change set equal to the earliest consistency set in the union of the CHANGE table and CHANGEDMSG table and determines the timestamp DATETIME for the change set (Block 1802). Next, the subroutine defines a query merging the change set and DEPENDMSG table to find all responses potentially affected by the change set (Block 1803). The records are looped over based on this query to identify candidate responses that may be obsolete. Each candidate response is recorded in a list by its request key MSG_ID (Block 1804).

If the request keys MSG_ID are chosen to be algorithmically related to the hash codes DB_ID by the application developer, a user exit routine which expresses this relationship may be supplied and used instead of the DEPENDMSG table—or some combination of the mapping may be supplied by the DEPENDMSG table and some by the exit routine, so long as the two together are comprehensive.

Based on the candidate response list generated in Block 1804, the old version of each candidate response is retrieved from the server cache (Block 1805) or generated if there is no server cache. Next, a new version of each candidate response is generated from the source data along with the timestamp for this new version (Block 1806). Each old version and the corresponding new version are compared to determine whether any change has occurred. If a change has occurred, then the request key MSG_ID is entered into a responses changed list (Block 1807).

For each request key in the CHANGEDMSG table, an entry is added to the BADMESSAGES table for every replica location USER_ID listed in the USERIDS table (Block 1808).

For each request key in the response changed list defined in Block 1807, the system adds the request key MSG_ID and timestamp to the BADMESSAGES table for each replica location listed in the USERIDS table (Block 1809).

Though not shown in the FIG., changes to take effect in the future are recorded in the BADMESSAGES table as follows. Based on the list generated in Block 1804 and if the prior BADMESSAGES table contains entries for timestamps greater than the timestamp of the present change (indicating changes to take effect in the future), entries for such future changes are made to the BADMESSAGES table. For each request key in the candidate response list, the new response identified above is compared to the value responsive to the request key for the earliest future change timestamp. If these two values differ, an entry is added to the BADMESSAGES table for the indicated future change timestamp and each replica location USER ID found in the USERIDS table.

Also, for each request key in the responses changed list defined in Block 1807, if there are changes recorded to take effect in the future, the system adds the request key MSG_ID to the BADMESSAGES table together with the timestamp of the earliest future change for each replica location listed in the USERIDS table. If any problems occur during the subroutine then it is decommitted to prevent any loss of data (Block 1810).

Last, the processed entries are dropped from the CHANGE table and the CHANGEDMSG table (Block 1811). If the two tables are not empty, then the subroutine returns to Block 1801 to generate a new set of changes to be stored to the BADMESSAGES table (Block 1812). When the tables are empty, then the storage management clears the worklist for subsequent use (Block 1813).

IV. Conclusion

The foregoing describes an apparatus and a method for managing and propagating source data changes to replica locations throughout a distributed network of processors. The invention provides for the management of versions of data objects to preserve consistency of views throughout the system for individual replica locations. It operates in conjunction with any arbitrary system for mapping from source data objects to responses. Further, the maintenance of obsolescence data in the invalidation manager and the use of an atomic demand/response transaction format provides failsafe operation under all service disruptions and allows processing overhead to occur at periods of minimal cost.

The foregoing description of an embodiment of the invention has been provided for the purposes of example and description. Those skilled in the art will understand that many variations and modifications can be made to the embodiment described that fall within the spirit and scope of the invention. It is intended that the scope of the invention be limited only by the claims set forth below.

We claim:

1. A method for managing obsolescence of replicas of data objects, the objects being utilized in multiple nodes of a distributed processing system in which at least one node operates as an object source location having access to a source database containing source data objects and at least one other node operates as an object replica location having means for storing replicas of requested objects received from a source location, each source data object being alterable whereby replicas of altered objects stored at replica locations may become obsolete, comprising the steps of:

responsive to a request from a first replica location to ascertain obsolescence of data objects, extracting at the source location identifiers of a set of obsolete objects;

communicating said identifiers, if any, as an atomic demand/response transaction to said first replica location;

rendering inaccessible at said first replica location any replicas corresponding to those identifiers received from the source location; and removing from the source location those identifiers communicated to said first replica location.

2. The method of claim 1, further including the steps of:

associating at the source location a currency version number with said first replica location identifying a set of obsolete versions of source data objects for which identifiers have not been successfully communicated thereto;

associating a data version number with data objects retrieved from the source database to identify a particular version of the data objects retrieved; and responsive to a request from said first replica location for a target source data object, returning a version of said target source data object being requested, said version having a data version number that is consistent with the currency version number, unless this condition cannot be satisfied.

3. A method for locating and rendering inaccessible obsolete versions of data objects, the objects being utilized in multiple nodes of a distributed processing system in which at least one node operates as an object source location having access to a source database containing source data objects and at least one other node operates as an object replica location having means for storing versions of requested objects received from a source location, each source data object being alterable whereby a plurality of versions are created and versions stored at replica locations may become obsolete, the relative obsolescence of each version at any time t being identifiable by a version number corresponding to its position in a temporal sequence, including an oldest version and a most recent version, among versions of source data objects comprising the steps at each source location of:

maintaining a list of replica locations;

maintaining a list of identifiers of obsolete versions of source data objects for each identified replica location;

responsive to a request at a time $t_1$ from a first replica location to ascertain obsolescence of at least one data object, extracting from list of identifiers a first subset of identifiers corresponding to versions which have previously been sent to said first replica location, and extracting from the first subset of identifiers, a second subset of identifiers corresponding to versions which are oldest in said temporal sequence at time $t_1$;

sending the second subset of identifiers to said first replica location as one or more messages in an atomic demand/response sequence, any interruption in the sequence resulting in an abort; and responsive to an acknowledgment from the replica location, deleting the second subset of identifiers from the list of identifiers; and comprising the steps at said first replica location of:

sending at least once to each source location employed by this replica location, a signal identifying this replica location;

initiating a request to ascertain obsolescence of at least one data object from the source location; and upon receiving one or more messages from the source location, rendering inaccessible those versions of data objects identified by any one of the messages so received.

4. The method of claim 3, wherein said acknowledgement from the replica location comprises a further request to ascertain obsolescence.

5. The method of claim 3, further including the steps at the source location of:

responsive to a request from a second replica location for a first data object, extracting at a time $t_e$ from said second replica location's list of identifiers, the version number of a first identifier corresponding to the oldest version $V_{oc}$ at $t_e$ whose obsolescence has not yet been successfully communicated to said second replica location; and sending a version of said first data object having a version number immediately preceding the version number of $V_{oc}$ if $V_{oc}$ is older than the version number indicating $t_e$;

sending a version of said first data object having a version number immediately preceding the version number indicating $t_e$ if $V_{oc}$ is newer than the version number indicating $t_e$; and further including the step at the replica location of: initiating a request for a data object.

6. In a distributed processing system having a network of nodes connected by communication links in which at least one node of the system operates as a source location having access to a source database containing source data objects and at least one other node operates as a replica location having a means for storing replicas of source data objects received from a source location, an apparatus for managing obsolescence of replicas comprising:

manager means, in communication with a source location, for maintaining obsolescence data identifying obsolete replicas;

means at a requesting replica location for generating an invalidation request for at least a portion of the obsolescence data; and server means, in communication with the manager means and the requesting replica location and responsive to the invalidation request, for supplying the portion of the obsolescence data to the requesting replica location.

7. The apparatus of claim 6, wherein said server means further includes:

interceptor means, connected to a communication link connecting the source location and the requesting replica location, for detecting the invalidation request.

8. The apparatus of claim 6, wherein said manager means supplies the obsolescence data to the requesting replica location as an atomic demand/response transaction.

9. The apparatus of claim 6, further including:

means at the requesting replica location for generating a request for a first replica of a source data object; and wherein the obsolescence data includes currency data identifying obsolete versions of data objects that have not been successfully communicated to the requesting replica location; and the server means includes means responsive to said request for said first replica and the currency data for providing said first replica of source data objects when source data objects consistent with the currency data for the requesting replica location are available, otherwise preventing access to said first replica.

10. The apparatus of claim 9, further including:

buffer means, in communication with the server means, for storing source data objects keyed by requests identifying the source data object and versions of the source data object.

* * * * *